United States Patent
Walters

[15] 3,668,970
[45] June 13, 1972

[54] ROCKET LAUNCHERS

[72] Inventor: Arthur Gwynfryn Walters, Bexley, England

[73] Assignee: Secretary of State for Defense in the Government of the United Kingdom

[22] Filed: July 22, 1958

[21] Appl. No.: 750,262

[52] U.S. Cl.................................................89/1.819, 89/1.8
[51] Int. Cl..........................................................F41f 3/04
[58] Field of Search.......................89/1.7, 1.7 B, 1.8, 1.819; 42/76; 102/49

[56] References Cited

UNITED STATES PATENTS

| | | | |
|---|---|---|---|
| 2,429,021 | 10/1947 | Gould et al. | 89/1.7 |
| 2,515,051 | 7/1950 | Lloyd | 89/1.7 |
| 2,568,455 | 9/1951 | Lindvall et al. | 89/1.7 |
| 2,703,508 | 3/1955 | Lauritsen | 89/1.7 |
| 2,818,779 | 1/1958 | Koeper | 89/1.7 |

Primary Examiner—Samuel W. Engle
Attorney—S. J. Rotondi and A. T. Dupont

EXEMPLARY CLAIM

1. A launcher for a tubular rocket having a frame comprising four longitudinal angle beams, one at each corner of the frame, a lattice of struts connecting the beams, a series of transverse plates for stiffening the frame and having U-shaped recesses in their upper edges, and a U-section trough welded into the U-shaped recesses; a guide rail support fixed to the upper surface of each of the upper two angle beams; a plurality of spacers at intervals along the upper surfaces of the guide rail supports the spacers varying in thickness from zero at the center to a maximum at each end of each support the thicknesses being so graduated that the upper faces of the spaces lie on a smooth curve; and two guide rails bolted to the guide rail supports and in contact with the upper surfaces of the spacers whereby each said guide rail is constrained in an upwardly curved position, towards the opposite ends thereof.

2 Claims, 4 Drawing Figures

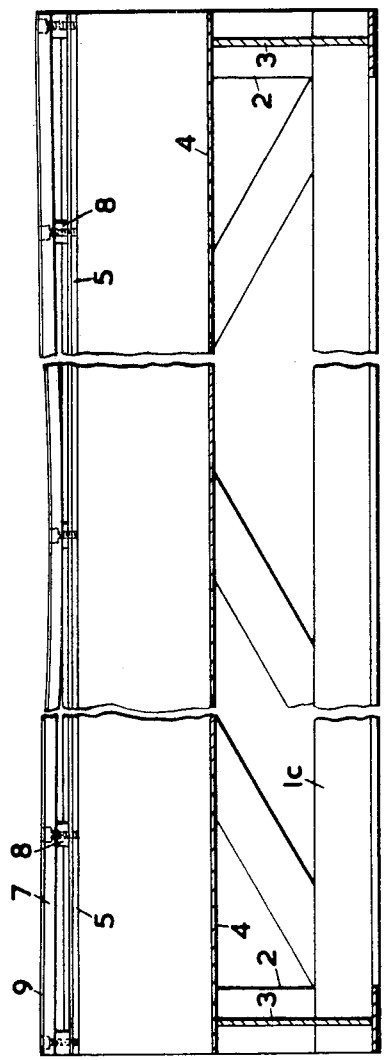
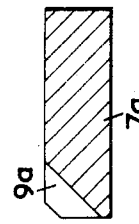
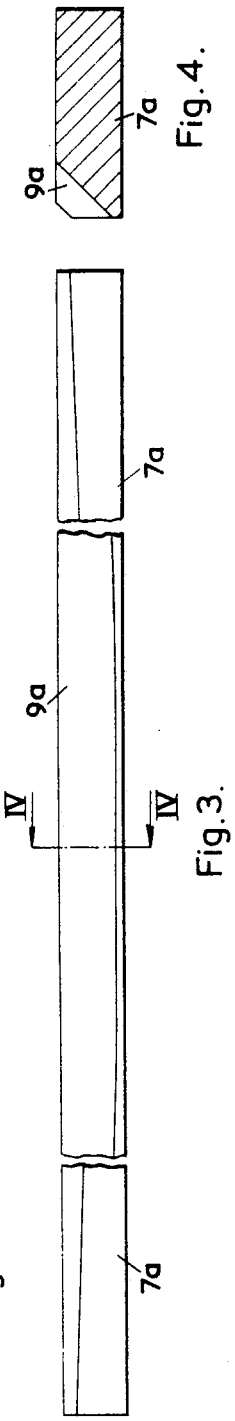
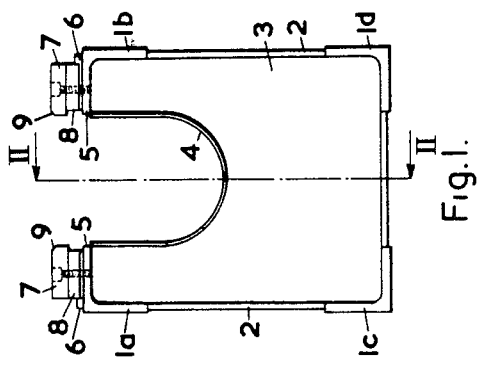
Inventor
Arthur G. Walters
By : S.J. Rotondi & A.J. Dupont

ROCKET LAUNCHERS

This invention relates to rocket launchers of the two rail type in which the rocket is guided during launching by a pair of rails whose distance apart is less than the diameter of the rocket body and along which the rocket is arranged to slide.

The tubular portion of the body of a rocket may be slightly curved longitudinally due to small errors in manufacture and such a rocket body when resting on a pair of straight rails may, if its convex side is adjacent the rails make single point contact with each rail. Although the curvature is normally extremely small the rocket may, during launching, oscillate about the contact points and although the oscillations will have a very small amplitude the angular velocity developed at any instant may be considerable. If the rocket has an appreciable angular velocity at the instant when it leaves the launcher serious disturbances in flight will arise which will be particularly serious since they occur during the early, critical stage of the flight.

The object of the present invention is to improve the initial steadiness of the rocket by ensuring that it makes two point contact with each rail during launching and hence eliminating the aforementioned oscillations.

The invention therefore provides, in a rocket launcher of the type described, guide rails having an upwardly curved guiding surface such that a rocket resting on the rails at any position along the length thereof will make contact with each rail at two separate points along its length.

The invention will now be more particularly described by way of example only with reference to the accompanying drawings in which:

FIG. 1 is an end view of a rocket launcher frame carrying a pair of guide rails, FIG. 2 is a section at II—II of FIG. 1 broken at two points to show each end and the center of the launcher frame, FIG. 3 is a side elevation of an alternative form of guide rail, broken at two points to show each end and the center of the rail.

FIG. 4 is a section at IV—IV of FIG. 3.

The launcher frame as shown in FIGS. 1 and 2 consists of a box girder comprising four longitudinal angle beams 1a, 1b, 1c, 1d connected by a lattice of struts 2 and stiffened by a series of transverse plates 3; and a U-section trough 4 welded into U-shaped recesses in the upper edges of the plates 3.

Welded to the tops of the horizontal flanges 5 of the upper angle beams 1a, 1b are two L shaped rail supports 6. Guide rails 7 are bolted to the supports 6 and flanges 5 over sets of spacers 8 distributed at suitable intervals along the rail supports 6. The thicknesses of the spacers 8 are graduated from zero at the centers of the rails 7 to a maximum at the ends of the rails. When bolted down over the spacers 8 the guide rails 7 are deformed into upwardly concave curves. A suitable guiding surface may be provided by chamfering the upper inside edges 9 of the rails 7.

FIGS. 3 and 4 show a modified form of rail 7a which, in an alternative construction, may be bolted directly to the rail supports without the use of spacers. The rail 7a is straight, the curved guiding surface being provided by a chamfer 9a which is deeper at the center than at the ends of the rail. Such a chamfer may be formed by planing an upper edge of the rail while the rail is strained elastically into an upwardly convex curve. After planing the rail is allowed to return to its unstrained, straight condition in which the planed edge will have an upwardly concave chamfer.

Since the curvature occurring in the rocket tubes is very small the curvature of the guide rails need only be small. A curvature which produces a departure from a straight line of about one-fourth inch in 10 feet is normally sufficient.

For purposes in which extreme accuracy is not essential such a curvature may be small enough to be ignored but where extreme accuracy is required it may be necessary to make an aiming correction to allow for the curvature.

I claim:

1. A launcher for a tubular rocket having a frame comprising four longitudinal angle beams, one at each corner of the frame, a lattice of struts connecting the beams, a series of transverse plates for stiffening the frame and having U-shaped recesses in their upper edges, and a U-section trough welded into the U-shaped recesses; a guide rail support fixed to the upper surface of each of the upper two angle beams; a plurality of spacers at intervals along the upper surfaces of the guide rail supports the spacers varying in thickness from zero at the center to a maximum at each end of each support the thicknesses being so graduated that the upper faces of the spaces lie on a smooth curve; and two guide rails bolted to the guide rail supports and in contact with the upper surfaces of the spacers whereby each said guide rail is constrained in an upwardly curved position, towards the opposite ends thereof.

2. A launcher for a tubular rocket having a frame comprising four longitudinal angle beams, one along each longitudinal edge of the frame, a lattice of struts connecting the beams, a series of transverse plates for stiffening the frame and having U-shaped recesses in their upper edges, and a U-section trough secured into the U-shaped recesses; a guide rail support fixed to the upper surface of each of the two upper angle beams; and a guide rail fixed to the upper face of each guide rail support; said guide rails being parallel and having chamfers on their adjacent upper edges, which chamfers are non-uniform in depth, the depth of said chamfers being so graduated as to provide an upwardly curved guiding surface from the center of each rail to each opposite end thereof.

* * * * *